United States Patent
Matsubara

(10) Patent No.: US 10,895,969 B2
(45) Date of Patent: Jan. 19, 2021

(54) INPUT APPARATUS ACCEPTABLE OF INPUT THROUGH ENLARGED IMAGES IN A DISPLAY AND COMPUTER-READABLE STORAGE MEDIUM THEREFOR

(71) Applicant: BROTHER KOGYO KABUSHIKI KAISHA, Aichi (JP)

(72) Inventor: Yu Matsubara, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 23 days.

(21) Appl. No.: 15/705,907

(22) Filed: Sep. 15, 2017

(65) Prior Publication Data
US 2018/0095646 A1  Apr. 5, 2018

(30) Foreign Application Priority Data
Sep. 30, 2016  (JP) .................. 2016-194404

(51) Int. Cl.
*G06F 3/048* (2013.01)
*G06F 3/0484* (2013.01)
(Continued)

(52) U.S. Cl.
CPC ........ *G06F 3/04845* (2013.01); *G06F 3/0482* (2013.01); *G06F 3/0485* (2013.01); *G06F 3/04886* (2013.01)

(58) Field of Classification Search
CPC .. G06F 3/04845; G06F 3/0482; G06F 3/0485; G06F 3/04886
See application file for complete search history.

(56) References Cited

U.S. PATENT DOCUMENTS

2004/0250216 A1* 12/2004 Roman ................. G06F 3/0481
715/800
2007/0152984 A1* 7/2007 Ording ................ G06F 3/04845
345/173
(Continued)

FOREIGN PATENT DOCUMENTS

JP  2004-021933 A  1/2004
JP  2005-182367 A  7/2005
(Continued)

OTHER PUBLICATIONS

Notice of Reasons for Refusal dated Apr. 28, 2020 received from the Japanese Patent Office in related application 2016-194404 together with English language translation.
(Continued)

*Primary Examiner* — Kieu D Vu
*Assistant Examiner* — Asteway T Gattew
(74) *Attorney, Agent, or Firm* — Scully, Scott, Murphy & Presser, PC

(57) ABSTRACT

A displaying input device, including a display, a touch-sensitive panel, a storage device, and a controller, is provided. The controller executes a detecting process, wherein a pointer position of a pointer based on position information output from the touch-sensitive panel and a specific operation performed by the pointer are detected; an initial display process, wherein an overall image based on data stored in the storage device is displayed in an initial size at a selectable image display area in an image displayable region; an enlarged image display process, wherein an enlarged image being a part of the overall image is displayed in an enlarged size in an enlarged image display area in the image displayable region; and a selection acceptance process, wherein selection of one of selectable images in the overall image
(Continued)

which is displayed at a released position, where a releasing operation is performed, is accepted.

19 Claims, 6 Drawing Sheets

(51) Int. Cl.
 *G06F 3/0482* (2013.01)
 *G06F 3/0485* (2013.01)
 *G06F 3/0488* (2013.01)

(56) References Cited

U.S. PATENT DOCUMENTS

| | | | | |
|---|---|---|---|---|
| 2010/0013852 A1* | 1/2010 | Liu | G06F 3/04886 | 345/592 |
| 2010/0156807 A1* | 6/2010 | Stallings | G06F 3/04886 | 345/173 |
| 2010/0289825 A1* | 11/2010 | Shin | G06F 3/04845 | 345/667 |
| 2010/0333011 A1* | 12/2010 | Kornev | G06F 3/04886 | 715/773 |
| 2011/0018812 A1* | 1/2011 | Baird | G06F 3/04886 | 345/173 |
| 2011/0025718 A1 | 2/2011 | Takarabe | | |
| 2011/0043434 A1* | 2/2011 | Roncalez | G06F 3/04847 | 345/3.1 |
| 2011/0083104 A1* | 4/2011 | Minton | G06F 3/04886 | 715/815 |
| 2011/0141066 A1* | 6/2011 | Shimotani | G01C 21/3664 | 345/177 |
| 2011/0161809 A1* | 6/2011 | Gilmour | G06F 1/1626 | 715/702 |
| 2011/0181535 A1 | 7/2011 | Takayama | | |
| 2014/0006995 A1* | 1/2014 | Bao | G06F 3/0416 | 715/773 |
| 2014/0285418 A1* | 9/2014 | Adachi | G06F 3/013 | 345/156 |
| 2015/0012869 A1* | 1/2015 | Artigue | G06F 3/04886 | 715/773 |
| 2016/0070441 A1* | 3/2016 | Paek | G06F 3/04842 | 715/773 |
| 2016/0139803 A1* | 5/2016 | Yan | G06F 3/0216 | 715/773 |
| 2016/0259548 A1* | 9/2016 | Ma | G06F 1/1626 | |

FOREIGN PATENT DOCUMENTS

| | | |
|---|---|---|
| JP | 2011-034169 A | 2/2011 |
| JP | 2011-107809 A | 6/2011 |
| JP | 2011-154573 A | 8/2011 |

OTHER PUBLICATIONS

Notice of Reasons for Refusal dated Aug. 4, 2020, received from the Japanese Patent Office in related application 2016-194404 together with English language translation.

* cited by examiner

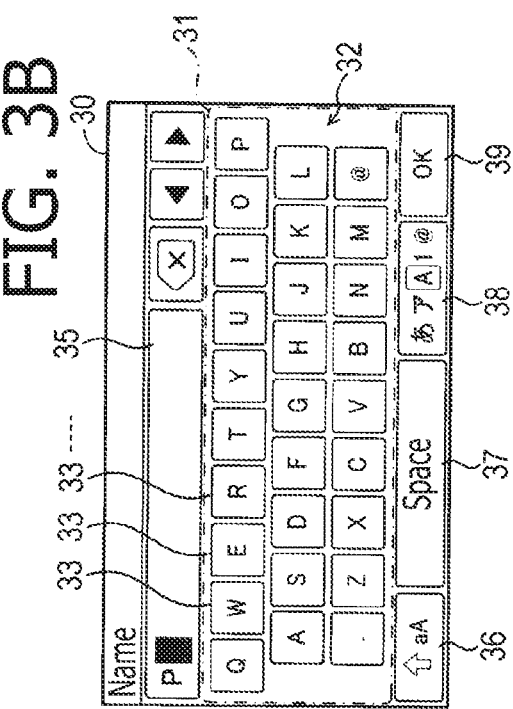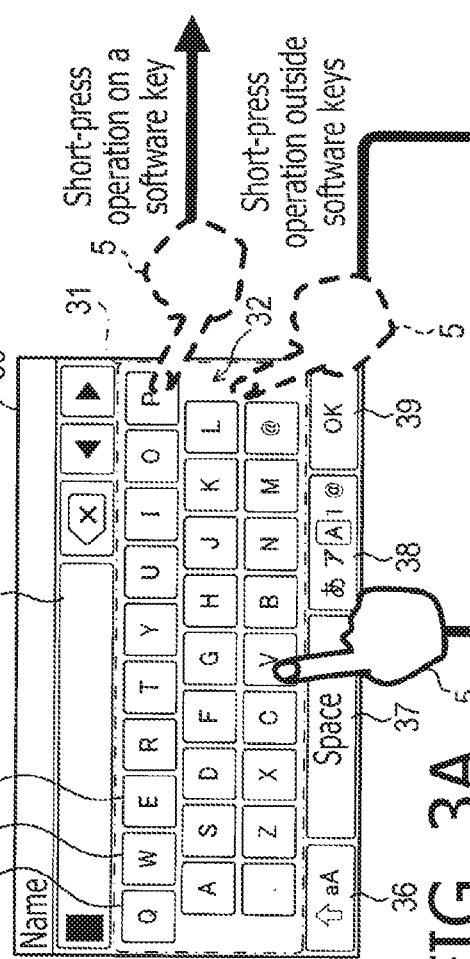

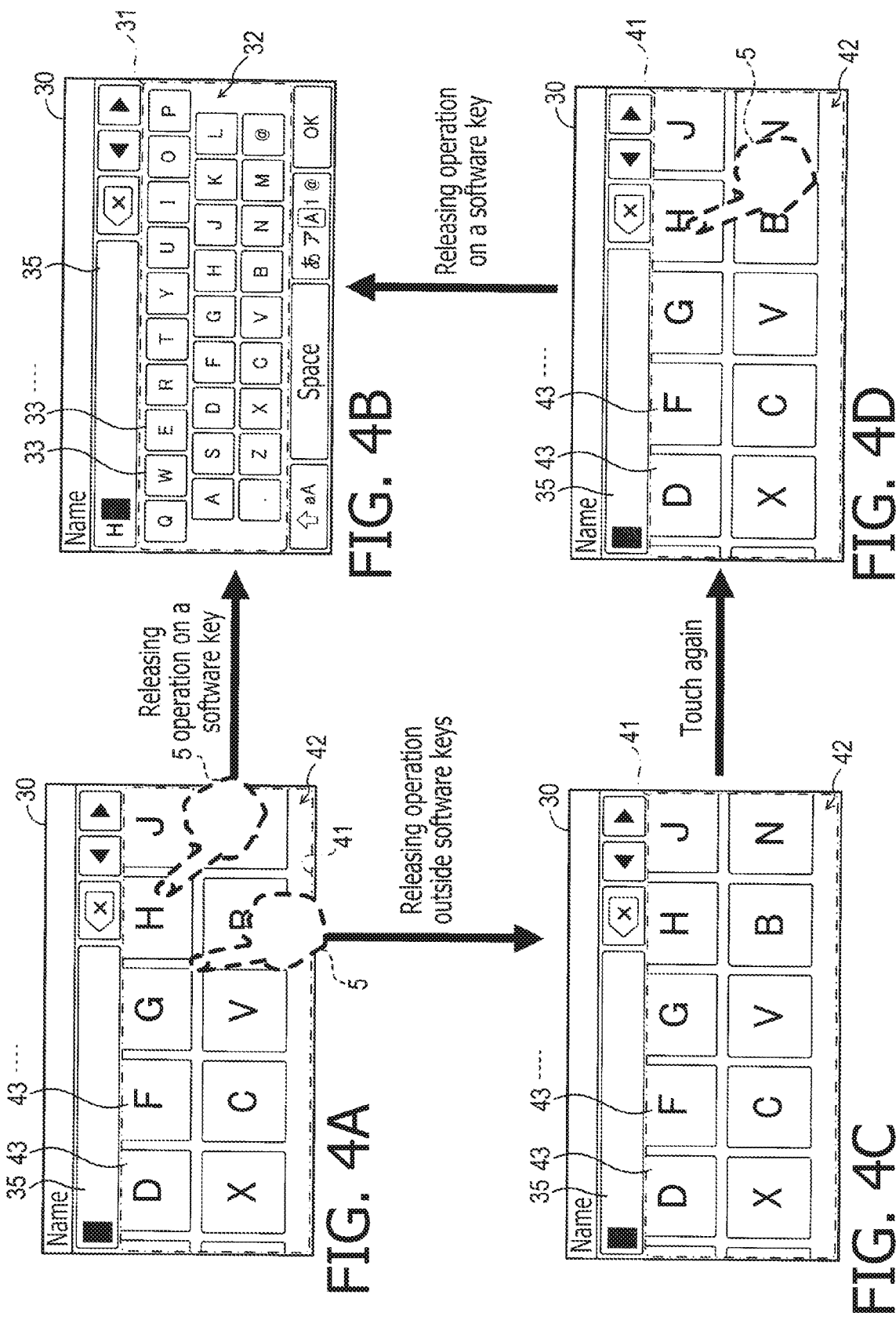

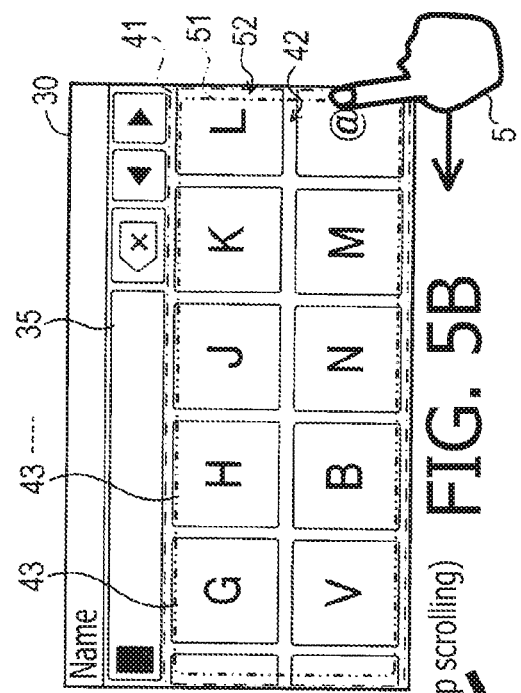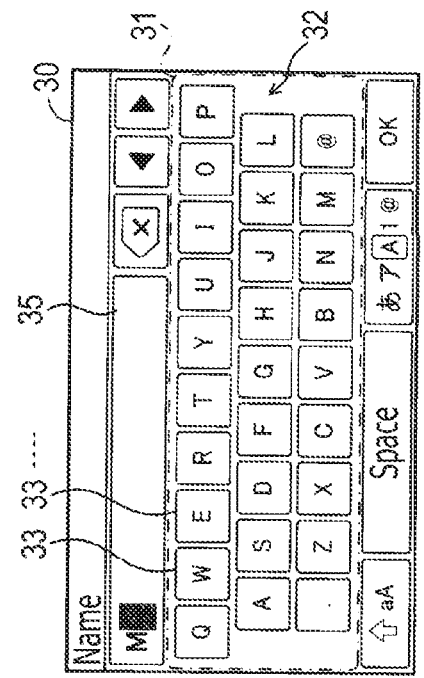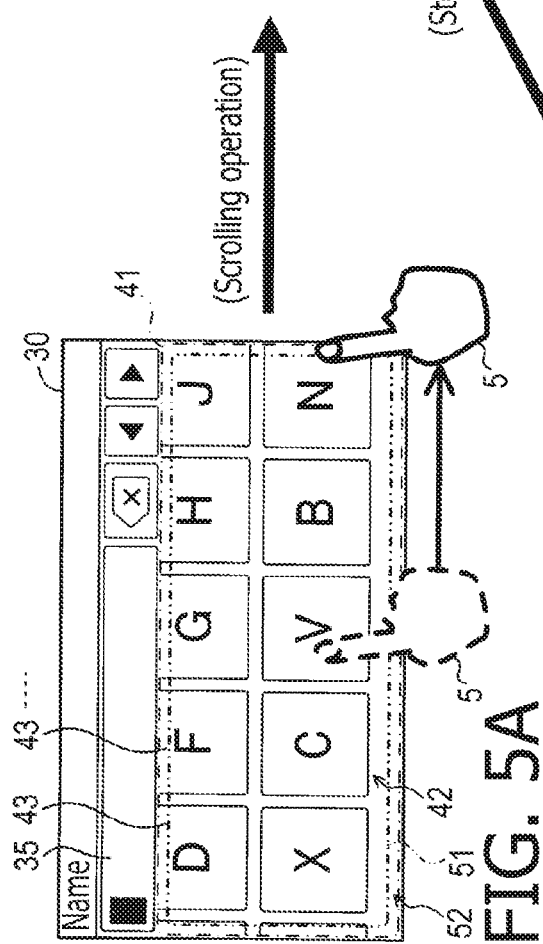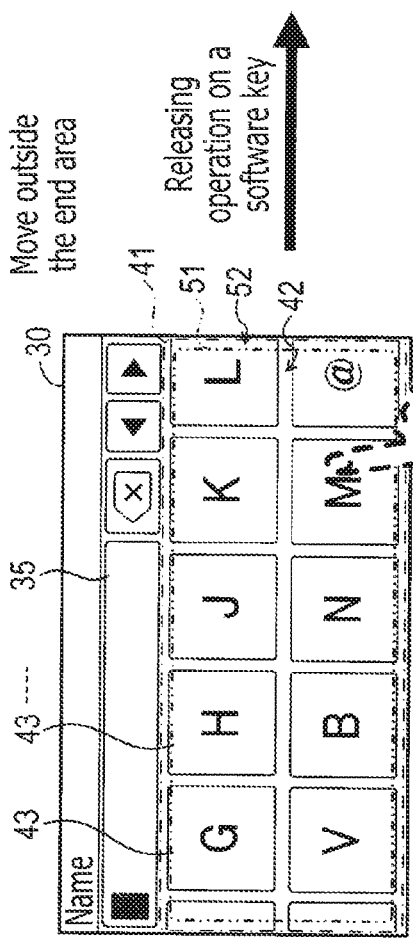

INPUT APPARATUS ACCEPTABLE OF INPUT THROUGH ENLARGED IMAGES IN A DISPLAY AND COMPUTER-READABLE STORAGE MEDIUM THEREFOR

CROSS REFERENCE TO RELATED APPLICATION

This application claims priority from Japanese Patent Application No. 2016-194404, filed on Sep. 30, 2016, the entire subject matter of which is incorporated herein by reference.

BACKGROUND

Technical Field

An aspect of the present invention is related to a displaying input apparatus with a touch-sensitive panel.

Related Art

A software keyboard to be used with a touch-sensitive panel as an input interface, through which text may be input in an information processing apparatus, including a printer, a scanner, a mobile terminal, is known.

The software keyboard may include software keys, which are images of letter or sign keys, arrayed on a screen of the touch-sensitive panel. A user may operate any of the software keys on the software keyboard with a pointer, including a finger and a pointing device such as a stylus, so that the letters or signs assigned to the operated software keys may be selected among the other keys on the software keyboard.

SUMMARY

A size of the software keys on the software keyboard may rely on a size of an image displayable region in the touch-sensitive panel. In other words, the smaller the image displayable region in the touch-sensitive panel is, the smaller the size of the software keys on the software keyboard being displayed in the image displayable region becomes.

When the size of the software keys is smaller, the user may experience difficulty to touch intended software keys and may touch or point at adjoining software keys unintentionally. Specifically, when the software keyboard has a larger quantity of software keys, such as a known QWERTY keyboard, the size of the software keys in the keyboard may need to be smaller, and the user may tend to touch wrong keys unintentionally.

The present invention is advantageous in that a displaying input apparatus, in which a quantity of actions to accept user's selection may be restrained from increasing, and unintentional input may be restrained, when a user attempts to input a selected one of a plurality of images displayed in a touch-sensitive panel with a pointer, is provided.

According to an aspect of the present disclosure, an input apparatus, having a display, a touch-sensitive panel, a storage device, and a controller, is provided. The display includes an image displayable region, in which an image is displayable. The touch-sensitive panel is configured to output position information indicating a pointer position, in which a pointing operation by a pointer is being performed, in the image displayable region. The pointing operation includes at least one of contact and close approach of the pointer to the image displayable region. The storage device is configured to store data for an overall image, which includes a plurality of selectable images. The controller is configured to execute a detecting process, in which the controller detects the pointer position based on the position information output from the touch-sensitive panel and a specific operation performed by the pointer, the specific operation being based on the pointing operation and including a touching operation, by which a state where no pointing operation is being performed shifts to a state where the pointing operation is being performed, and a releasing operation, by which the state where the pointing operation is being performed shifts to the state where no pointing operation is being performed; an initial display process, in which the controller controls the display to display the overall image based on the data stored in the storage device in an initial size at a selectable image display area in the image displayable region; an enlarged image display process, in which, based on detection of the touching operation in the selectable image display area in the detecting process while the overall image is being displayed in the initial size in the selectable image display area, the controller controls the display to display an enlarged image being a part of the overall image enlarged in an enlarged size, the enlarged size being larger than the initial size, in an enlarged image display area in the image displayable region, the enlarged image display area including at least the selectable image display area; and a selection acceptance process, in which, based on detection of the releasing operation in the detecting process while the enlarged image is being displayed in the enlarged image display process, and based on a condition where one of the selectable images is displayed at a released position, the released position being the pointer position where the releasing operation is being performed, the controller accepts selection of the one of the selectable images being displayed at the released position.

According to another aspect of the present disclosure, a non-transitory computer readable medium storing computer readable instructions that are executable by a computer in an input apparatus, which includes a display, a touch-sensitive panel, and a storage device, is provided. The display includes an image displayable region, in which an image is displayable. The touch-sensitive panel is configured to output position information indicating a pointer position, in which a pointing operation by a pointer is being performed, in the image displayable region. The pointing operation includes at least one of contact and close approach of the pointer to the image displayable region. The storage device is configured to store data for an overall image, which includes a plurality of selectable images. The computer readable instructions, when executed by the computer, cause the computer to execute a detecting process, in which the computer detects the pointer position based on the position information output from the touch-sensitive panel and a specific operation based on the pointing operation performed by the pointer, the specific operation including a touching operation, by which a state where no pointing operation is being performed shifts to a state where the pointing operation is being performed, and a releasing operation, by which the state where the pointing operation is being performed shifts to the state where no pointing operation is being performed; an initial display process, in which the computer controls the display to display the overall image based on the data stored in the storage device in an initial size at a selectable image display area in the image displayable region; an enlarged image display process, in which, based on detection of the touching operation in the selectable image display area in the detecting process while the overall image is being displayed in the initial size in the selectable image display area, the computer controls the display to display an enlarged image being a part of the overall image enlarged in an enlarged size, the enlarged size being larger than the initial size, in an enlarged image display area in the image displayable region, the enlarged image display area including at least the selectable image display area; and a selection acceptance process, in which, based on detection of the releasing operation in the detecting process while the enlarged image is being displayed in the enlarged image display process, and based on a condition where one of the selectable images is displayed at a released position, the released position being the pointer position where the releasing operation is being performed, the computer accepts selection of the one of the selectable images being displayed at the released position.

According to another aspect of the present disclosure, a method to control an input apparatus, the input apparatus having a display including an image displayable region in which an image is displayable; a touch-sensitive panel configured to output position information indicating a pointer position, in which a pointing operation by a pointer is being performed, in the image displayable region, the pointing operation including at least one of contact and close approach of the pointer to the image displayable region; a storage device configured to store data for an overall image, the overall image including a plurality of selectable images; and a controller, is provided. The method includes detecting the pointer position based on the position information output from the touch-sensitive panel and a specific operation performed by the pointer, the specific operation being based on the pointing operation and including a touching operation, by which a state where no pointing operation is being performed shifts to a state where the pointing operation is being performed, and a releasing operation, by which the state where the pointing operation is being performed shifts to the state where no pointing operation is being performed; controlling the display to display the overall image based on the data stored in the storage device in an initial size at a selectable image display area in the image displayable region; based on detection of the touching operation in the selectable image display area while the overall image is being displayed in the initial size in the selectable image display area, controlling the display to display an enlarged image being a part of the overall image enlarged in an enlarged size, the enlarged size being larger than the initial size, in an enlarged image display area in the image displayable region, the enlarged image display area including at least the selectable image display area; and based on detection of the releasing operation while the enlarged image is being displayed, and based on a condition where one of the selectable images is displayed at a released position, the released position being the pointer position where the releasing operation is being performed, accepting selection of the one of the selectable images being displayed at the released position.

BRIEF DESCRIPTION OF THE ACCOMPANYING DRAWINGS

FIGS. 3A-3D are illustrative views of screen transition in response to different operations to an initial-sized software keyboard with a pointer according the embodiment of the present disclosure.

FIGS. 4A-4D are illustrative views of screen transition in response to different operations to an enlarged software keyboard with the pointer according the embodiment of the present disclosure.

FIGS. 5A-5D are illustrative views of scrolling operations to the enlarged software keyboard according the embodiment of the present disclosure.

DETAILED DESCRIPTION

Hereinafter, an exemplary configuration of an image processing apparatus 10 according to an embodiment of the present disclosure will be described below.

Embodiment 1-1 Configuration of the Image Processing Apparatus

Figure 1:
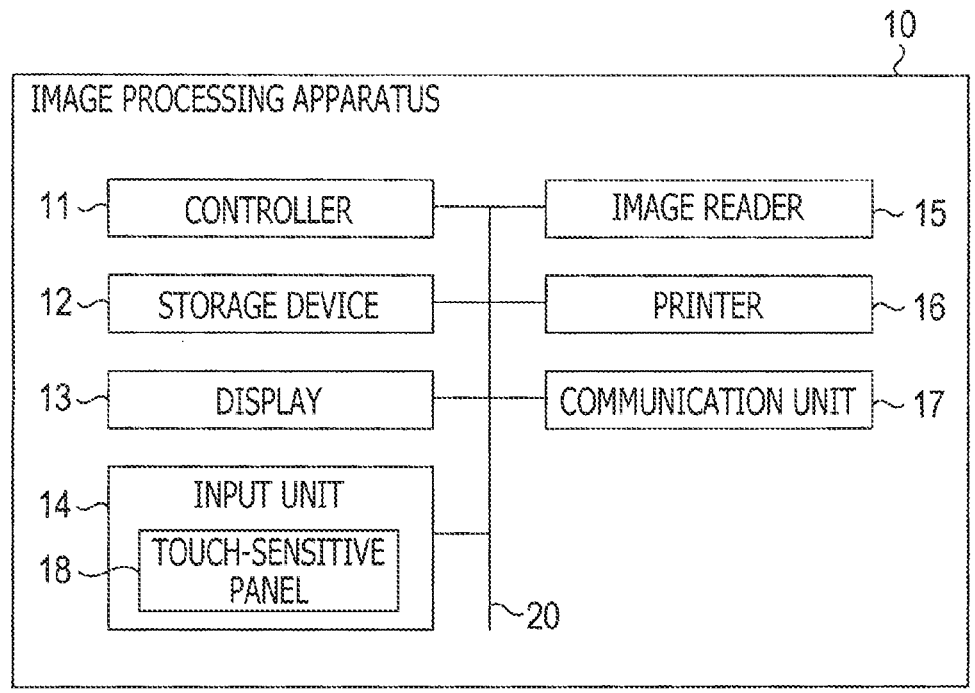
FIG. 1 is a block diagram to illustrate a configuration of an image processing apparatus according to an embodiment of the present disclosure.

The image processing apparatus 10 shown in FIG. 1 is equipped with multiple functions, including a scanning function to read an image of a sheet and generate image data of the read image, a printing function to print an image on a recording sheet, and a facsimile function to exchange facsimile data.

The image processing apparatus 10 includes, as shown in FIG. 1, a controller 11, a storage device 12, a display 13, and input unit 14, an image reader 15, a printer 16, and a communication unit 17, which are connected with one another through busses 20.

The controller 11 may include a central processing unit (CPU). The storage device 12 may include, but not necessarily limited to, semiconductor memory devices such as a read-only memory (ROM), a random access memory (RAM), a non-volatile RAM (NVRAM), and a flash memory. Thus, the image processing apparatus 10 includes a microcomputer having a CPU and a semiconductor memory device.

The controller 11 may implement the multiple functions by executing computer-readable programs stored in a non-transitory storage medium, such as the storage device 12. The functions in the image processing apparatus 10 may not necessarily be implemented by the controller 11 running the programs but may be partly or entirely implemented by one or more hardware computing devices.

The storage device 12 may store various types of image data to display images, including an image of a software keyboard 32 (see FIG. 2), which will be described later in detail, in an image displayable region. The storage device 12 may further store a program for a software-key controlling process (see FIGS. 6A-6B), which will be described later in detail.

The display 13 includes a display device, e.g., a liquid crystal display (LCD) and an organic electroluminescence (EL) display, which may display images. The input unit 14 includes an input device, through which a user's actions are accepted. The input device in the input unit 14 includes a touch-sensitive panel 18. The touch-sensitive panel 18 is located within the image displayable region, in which images may be displayed, in the display device of the display 13.

The touch-sensitive panel 18 may detect a pointing operation from the user with a pointer that contacts or closely approaches the image displayable region in the display 13. Therefore, while the pointer is performing a pointing operation at an area in the image displayable region in the display 13, the touch-sensitive panel 18 outputs position information, which indicates a position of the area being pointed at by the pointer, to the controller 11. The touch-sensitive panel 18 may output the position information either continuously or periodically while the pointer is pointing at the area in the image displayable region in the display 13. The pointing operation with the pointer to the touch-sensitive panel 18 may include at least one of contact to the touch-sensitive panel 18 and close approach to the touch-sensitive panel 18. In other words, the touch-sensitive panel 18 may detect contact of the pointer alone, close approach of the pointer alone, or both of contact and close approach of the pointer, as a pointing operation.

The controller 11 may receive the position information output from the touch-sensitive panel 18 through the busses 20. Based on the position information, the controller 11 may detect the pointing operation by the pointer and a position of the pointing operation being performed. Further, the controller 11 may detect at least a type of the operation performed by the pointer.

Operations that may be detected and determined by the controller 11 are based on the pointing operation and at least include a touching operation, by which a state where no pointing operation is being performed shifts to a state where a pointing operation is being performed, and a releasing operation, by which the state where a pointing operation is being performed shifts to the state where no pointing operation is being performed. Further, the controller 11 may detect a dragging operation, a flicking operation, and a tapping operation based on state transition at the position being pointed at with the pointer.

The pointer to perform the pointing operation may include, but not necessarily be limited to, a finger and a pointing device such as a stylus pen. In the present embodiment, as shown in FIGS. 3A-3D through 5A-5D, a pointing finger of a user's right hand represents a pointer 5.

The image reader 15 includes an image sensor and may read an original image and generate image data for the original image having been read. The printer 16 may print an image on a recording sheet in, for example, an inkjet printing technology or an electro-photographic technology. The communication unit 17 includes a communication interface to connect the image processing apparatus 10 with an internal or external communication network. The communication network to which the image processing apparatus 10 may be connected may include, but not necessarily be limited to, a local area network (LAN), the Internet, and a public telephone network.

1-2 Screens for Inputting Characters

As the image processing apparatus 10 is powered and activated, the controller 11 performs a particular initializing process and thereafter manipulates the display 13 to display a particular initial screen. A user may operate the input unit 14 to input instructions to the controller 11 to replace the screens in the display 13 from one to another according to the instructions.

The screens to be displayed in the display 13 may include selection-acceptance screens, through which the user may make selection for an image by the pointing operation with the pointer. The selection-acceptance screens may include, for example, an image selectable screen, through which the user may select one or more sets of image data stored in the storage device 12. For another example, the selection-acceptance screens may include a character input screen 30 (see FIG. 2) containing a software keyboard 32, through which the user may input characters or text.

Figure 2:
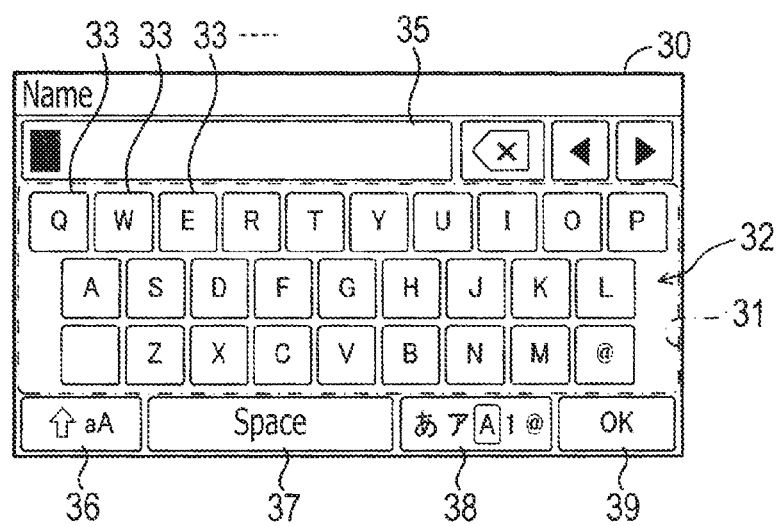
FIG. 2 is an illustrative view of a character input screen to be displayed in the image processing apparatus according to the embodiment of the present disclosure.

As shown in FIG. 2, the character input screen 30 may be displayed substantially entirely over the image displayable region in the display 13. The character input screen 30 may be displayed in multiple situations, such as editing a phonebook, setting network connection, and naming a shortcut access to a specific function, where the user may be prompted to input a character, a letter, a sign, a symbol, or a numeric figure. In the following description, letters, sings, symbols, numeric figures, and other characters that may represent or constitute information may be referred to as characters.

The character input screen 30 in FIG. 2 includes a software key display area 31, in which a software keyboard 32 is displayed. The software keyboard 32 being a virtual keyboard includes a plurality of software keys 33. Each of the software keys 33 may have a square or rectangular shape and includes a textual image of a specific letter, a character, a sign, a symbol, or a numeric figure assigned thereto.

The software keyboard 33, as shown in FIG. 2, may contain 28 software keys 33 and may be a known QWERTY keyboard.

FIG. 2 illustrates an overall image of the software keyboard 32 displayed in an initial size in the software key display area 31. In the initial size, the overall software keys 33 contained in the software keyboard 32 are entirely displayed at a time in the software key display area 31. The user may perform a pointing operation to one of the software keys 33 with the pointer to select the software key 33.

The character input screen 30 further includes a selection display field 35, in which a character assigned to the software key 33 selected by the user's pointing operation with the pointer may be displayed.

The character input screen 30 further includes a capitalization key 36, a space key 37, a character toggle key 38, and an OK key 39. The capitalization key 36 is a key to toggle between an uppercase mode and a lowercase mode for alphabet letters to be input. The space key 37 is a key to insert a blank between characters. The OK key 39 is a key to input the characters displayed in the selection display field 35.

The character toggle key 38 is a key to toggle types of characters to be input to the image processing apparatus 10. For example, the types of the characters may include alphabet, numeric figures, symbols, hiragana and katakana in Japanese language; and input modes to input these characters may be toggled by the character toggle key 38. FIG. 2 illustrates the character input screen 30, where alphabet is the character selected to be used for input; and while alphabet is being selected, the QWERTY keyboard is displayed in the character input screen 30. Meanwhile, when other type of character than alphabet is being selected to be used for input, a software keyboard (not shown) corresponding to the character being selected may be displayed in the software key display area 31. For example, while numeric figures is being selected to be the character to be used for input, a software keyboard in a form of a numeric keypad may be displayed.

1-3. Operations to Select Characters

Operations to be made by a user to select characters through the character input screen 30 with the software keyboard 32 in the form of QWERTY keyboard will be described with reference to FIGS. 3A-3D, 4A-4D, and 5A-5D. In the following description, any of the software keys 33 may be referred to by a name of a character assigned thereto plus a term "key." For example, "Q-key" may refer to one of the 28 software keys 33, to which letter Q is assigned.

As shown in FIG. 3A, while the overall software keyboard 32 is displayed in the initial size in the software key display area 31, a user may manipulate the pointer 5 to make a short-pressing operation on "P-key" so that selection of the P-key is accepted, and, as shown in FIG. 3B, letter P may be displayed in the selection display field 35. The short-pressing operation may mean making a touching operation with the pointer 5 to the software key 33 or anywhere in the character input screen 30 and making a releasing operation on the character input screen 30 before a particular length of holding period elapses. Therefore, when the user makes the short-pressing operation on any of the software keys 33, the software key 33 being displayed at the position where the pointer 5 performed the releasing operation, is selected.

On the other hand, the user may manipulate the pointer 5 to make a long-pressing operation on anywhere in the software key display area 31 so that, as shown in FIG. 3C, an enlarged image 42, in which a part of the software keyboard 32 is resized to a particular enlarged size, is displayed in an enlarged image display area 41. The enlarged image display area 41, in which the enlarged image 42 is displayed, includes at least a part of the software key display area 31 where the initial-sized software keyboard 32 before being enlarged was displayed. The long-pressing operation may mean making a touching operation with the pointer 5 to the software key 33 or anywhere in the character input screen 30 and maintaining the pointer 5 touching thereon at least for the particular length of holding period before making a releasing operation on the character input screen 30.

When the long-pressing operation with the pointer 5 to a position in the software key display area 31 is maintained for the particular holding period, the image of the software keyboard 32 is enlarged centrically at a pointer position, where the pointer 5 is pointing to at the time where the holding period elapses. Thus, the enlarged image 42, including a partial image of the software keyboard 32, is displayed in the enlarged display area 41.

While the image of the software keyboard 32 is enlarged centrically at the pointer position where the pointer 5 is pointing to at the time where the holding period elapses, the software key 33 being displayed at the pointer position before and after the enlargement remains the same. For example, as shown in FIG. 3A, the user may make the long-pressing operation with the pointer 5 to point at "V-key" in the initial-sized software keyboard 32. The software keyboard 32 may be enlarged centrically at the position being pointed at with the pointer 5, and, the pointer position being pointed at by the pointer 5 should stay on the V-key in the enlarged image 42 as well.

In this regard, a size of the software keys 43 in the enlarged image 42 is larger than the software keys 33 in the initial-sized software keyboard 32. Therefore, solely the software keys 43 being a part of the software keys 33 may be displayed in the enlarged image 42.

Meanwhile, a ratio between the size of the enlarged image 42 and the initial size of the software keyboard 32, or to which extent the partial image of the software keyboard 32 may be enlarged to be the enlarged image 42, may not necessarily be limited but may be determined by a manufacturer, a user, or any other person that may be involved in operations of the image processing apparatus 10.

Once the enlarged image 42 is displayed, as shown in FIG. 3C, the user may hold the pointer 5 touched on the image displayable region and slide the pointer 5 to another position within the image displayable region in the display 13.

When the user makes a releasing operation with the pointer 5 to the image displayable region in the display 13, a software key 43 may be displayed at a released position, i.e., the position being pointed at by the pointer 5 at the time of the releasing operation, or the position having been pointed at by the pointer 5 immediately before the pointing operation ended. In this regard, the software key 43 being at the released position is selected.

For example, as shown in FIG. 4A, the user may make a releasing operation with the pointer 5 on "H-key" among the software keys 43 in the enlarged image 42. Thereby selection of the H-key is accepted, and as shown in FIG. 4B, a letter H is displayed in the selection display field 35. Further, if the user makes a releasing operation with the pointer 5 on any of the software keys 43, selection of the software key 43 at the released position is accepted, and, as shown in FIG. 4B, the character input screen 30 may return to the initial size. In other words, the software keyboard 32 in the initial size is displayed in the software key display area 31.

On the other hand, the user may make a releasing operation with the pointer 5 at a position in the enlarged image 42 where no software key 43 is displayed (see FIG. 4A). In response to this releasing operation, no selection of a character is inputted, and the enlarged image 42 remains the same, as shown in FIG. 4C. On the same enlarged image 42, the user may again make a touching operation and a releasing operation with the pointing object 5 at any one of the software keys 43 so that the software key 43 at the released position may be selected. For example, the user may make a touching operation on the enlarged image 42 and make a releasing operation with the pointer 5 at the H-key in the enlarged image 42. In response, selection of the H-key is accepted, and, as shown in FIG. 4B, the letter H is displayed in the selection display field 35.

The user may make a short-pressing operation with the pointer 5 at a position within the software key display area 31 (see FIG. 3A) and make a releasing operation at a position where no software key 33 is displayed. In response to this releasing operation, the enlarged image 42 as shown in FIG. 3D may be displayed in the enlarged image display area 41. In this enlarged image 42, the software keyboard 32 enlarged centrically at the released position may be displayed as well. In this regard, again, the user may make a touching operation on the enlarged image 42 and make a releasing operation with the pointer 5 on one of the software keys 43 in the enlarged image 42 so that the software key 43 at the released position may be selected.

Further, while the enlarged image 42 is being displayed, the user may place the pointer 5 at a position within an end area 52, which is reserved within the enlarged image display area 41 along an outline of the enlarged image display area 41. In response, the enlarged image 42 may be scrolled within the enlarged image display area 41.

The end area 52 is reserved between the outline of the enlarged image display area 41 and a border 51 set inside the enlarged image display area 41 in a form of a frame. The enlarged image 42 may scroll within the enlarged image display area 41 when the pointer position pointed at by the pointer 5 is within the end area 52 to move in a direction, which relies on the position of the pointer 5 within the end area 52.

For example, as shown in FIGS. 5A-5B, the user may move the pointer 5 to slide rightward on the enlarged image 42, and the pointer position pointed at by the pointer 5 may move into the end area 52, specifically, in an area vertically stretching on a rightward end of the enlarged image display area 41. In response, the enlarged image 42 may scroll leftward. Accordingly, some of the software keys 43, e.g., "M-key" and "@-key," on the right-hand side of "N-key," which were not displayed previously (see FIG. 5A), may be displayed subsequently in the enlarged image display area 41 (see FIG. 5B).

The enlarged image 42 may continue scrolling at a particular constant scrolling speed as long as the pointer position pointed at by the pointer 5 stays inside the end area 52. When the enlarged image 42 is scrolled to the end, where there is no more enlarged image 42 to be displayed, the enlarged image 42 may stop scrolling thereat. FIG. 5B illustrates a transitive state of the enlarged image 42, scrolled leftward from the state shown in FIG. 5A, while the enlarged image 42 has another part which is yet to be scrolled further leftward and displayed. If the enlarged image 42 is scrolled further leftward from the position shown in FIG. 5B to a position, for example, shown in FIG. 3D, the enlarged image 42 may stop scrolling.

While the enlarged image 42 is being scrolled, if the pointer position pointed at by the pointer 5 is moved outside the end area 52, the enlarged image 42 may stop scrolling. For example, when the enlarged image 42 is scrolled leftward to the position shown in FIG. 5B by the pointer 5 moved rightward, the pointer 5 may now be moved leftward, and the pointer position may exit the end area 52. In response, the enlarged image 42 may stop scrolling. Thereafter, a releasing operation may be made on the enlarged image 42 at the position of the M-key, as shown in FIG. 5C, so that selection of the M-key may be accepted, and, as shown in FIG. 5D, the selected letter M may be displayed in the selection display field 35.

In this regard, when the pointer position pointed to by the pointer 5 moves into a part of the end area 52 that stretches vertically on the leftward end of the enlarged image display area 41, the enlarged image 42 may scroll rightward. When the pointer position pointed to by the pointer 5 moves into a part of the end area 52 that stretches horizontally on an upper end of the enlarged image display area 41, the enlarged image 42 may scroll downward. When the pointer position pointed to by the pointer 5 moves into a part of the end area 52 that stretches horizontally on a lower end of the enlarged image display area 41, the enlarged image 42 may scroll upward. In other words, the enlarged image 42 may scroll in a direction of the pointer position by the pointer 5 moving into the end area 52. Thus, the software keys 43 contained in the enlarged image 42 that are not displayed may be moved to be displayed.

1-4. Flow of Software Key Controlling Process

Figure 6A:
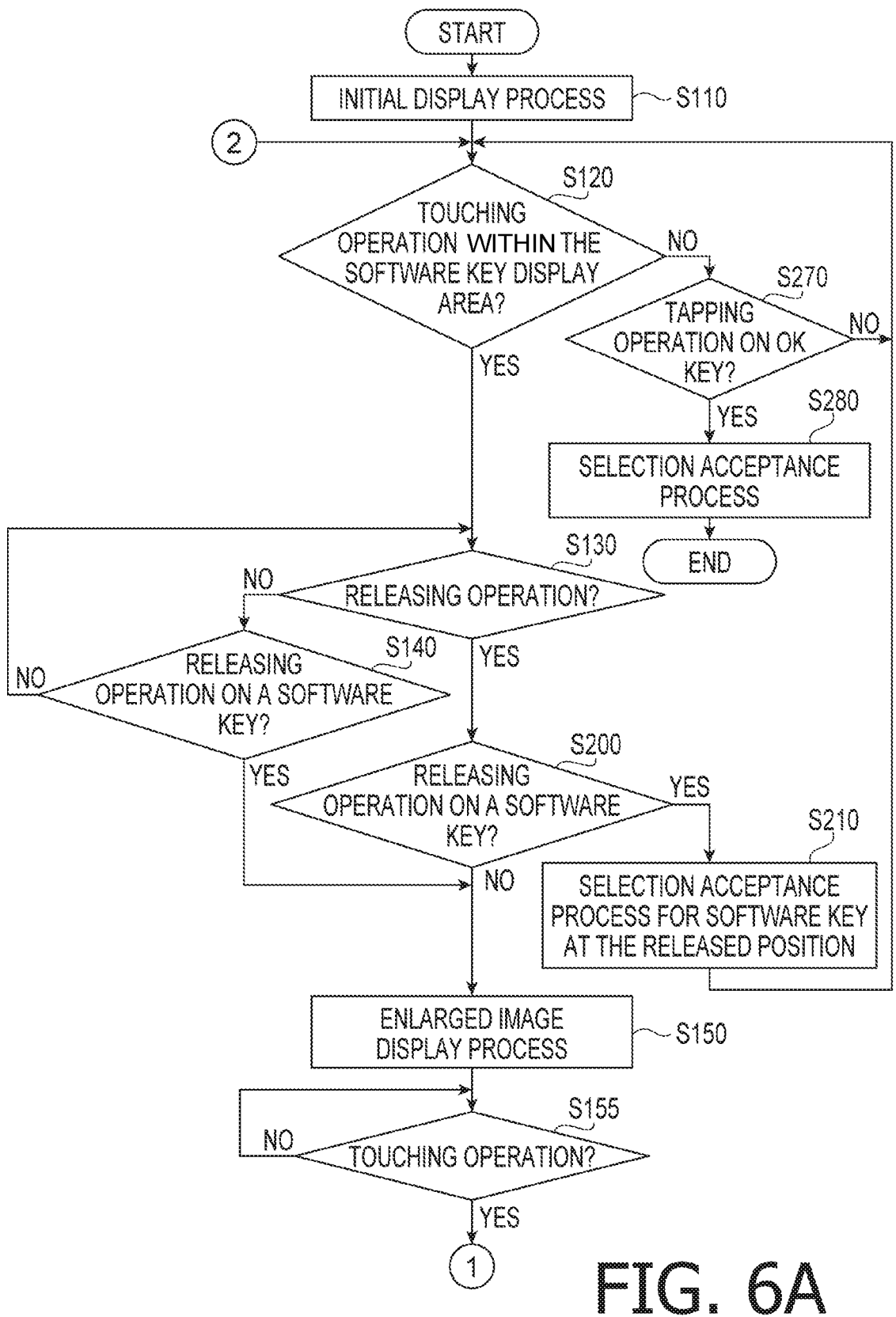
FIGS. 6A-6B are flowcharts to illustrate a flow of steps in a software key controlling process to be executed in the image processing apparatus according to the embodiment of the present disclosure.
Figure 6B:
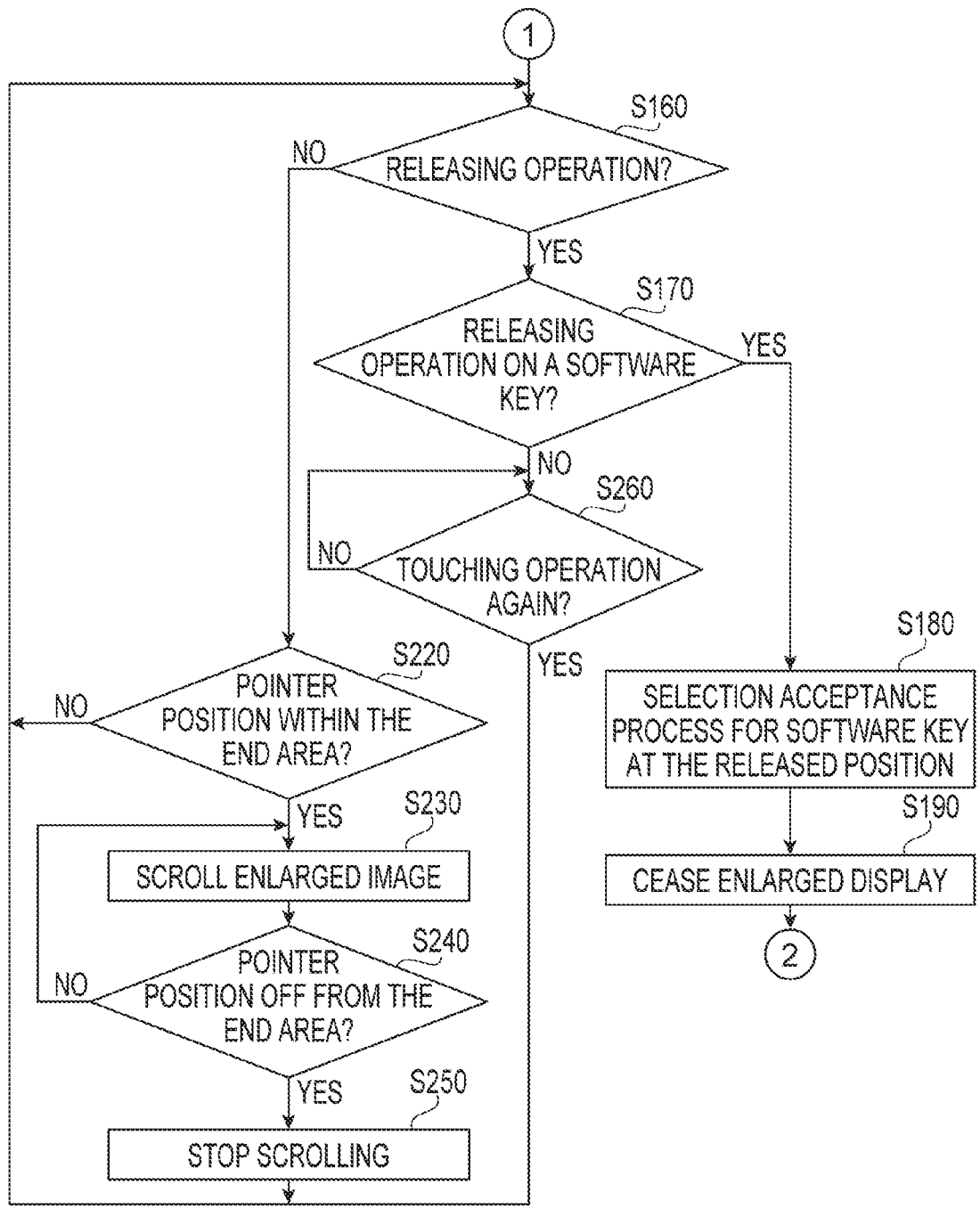

A software key controlling process to be executed by the controller 11 will be described below with reference to FIGS. 6A-6B. The controller 11 may activate a program for the software key controlling process stored in the storage device 12 when an event, such as a user's operation, occurs, and a specific condition of the image processing apparatus 1, which may require display of the character input screen 30 (see FIG. 2) in the image displayable region in the display 13 is met. The transition of the screens shown in FIGS. 3A-3D through 5A-5D may be caused by the controller 11 executing the software key controlling process shown in FIGS. 6A-6B.

As the controller 11 starts the software key controlling process, in S110, the controller 11 conducts an initial display process. In particular, the controller 11 manipulates the display 13 to display the character input screen 30 (see FIG. 2) with the initial-sized software keyboard 32 being displayed in the software key display area 31.

In S120, the controller 11 determines whether a touching operation to the software key display area 31 performed by the pointer 5 is detected. If no touching operation to the software key display area 31 is detected (S270: NO), the flow proceeds to S270.

In S270, the controller 11 determines whether a tapping operation is performed to the OK key 39 by the pointer 5. The tapping operation may either be a long-pressing operation or a short-pressing operation, or any other operation that involves a pointing operation. If a tapping operation is performed to the OK key 39 (S270: YES), in S280, the controller 11 conducts a selection acceptance process, in which the character(s) displayed in the selection display field 35 is accepted as the text to be input through the character input screen 30. The controller 11 ends the software key controlling process thereat. Following the software key controlling process, the screen in the image displayable region may be replaced to a particular image, which is set to be displayed after the character input screen 30.

In S270, if no tapping operation is performed (S270: NO), the flow returns to S120. Meanwhile, if the pointer 5 performs a pointing operation to an area other than the software key display area 31 or the OK key 39, the controller 11 may conduct a process corresponding to the pointer position. For example, if a tapping operation is performed to the space key 37, the controller 11 may manipulate the display 13 to leave a blank in the selection display field 35.

In S120, if a touching operation is performed to the software key display area 31, the flow proceeds to S130. In S130, the controller 11 determines whether a releasing operation performed by the pointer 5 is detected. If no releasing operation is detected (S130: NO), in S140, the controller 11 determines whether a pointed condition, in which the pointer 5 is performing a pointing operation on the software key display area 31, is maintained for the length of the particular holding period or longer.

If the pointed condition is not maintained for the length of the holding period (S140: NO), the flow returns to S130. In S130, if a releasing operation performed by the pointer 5 is detected before the holding period elapses, that is, if the short-pressing operation is detected, the flow proceeds to S200. In S200, the controller 11 determines whether the released position where the pointer 5 performs the releasing operation falls on any one of the software keys 33. In other words, the controller 11 determines whether the releasing action was detected at any one of the software keys 33.

If the releasing operation was detected at any one of the software keys 33 (S200: YES), in S210, the controller 11 conducts a selection acceptance process for the software key 33 being displayed at the released position. In other words, the controller 11 accepts selection of a character assigned to the software key 33 at the released position and displays the selected character in the selection display field 35. The flow proceeds to S120.

In S200, if no releasing operation is detected at any one of the software keys 33 (S200: NO), the flow proceeds to S150, in which the controller 11 conducts an enlarged image display process. Meanwhile, in S140, if the pointed condition is maintained for the length of the holding period or longer (S140: YES), in other words, if a long-pressing operation is performed, the flow proceeds to S150 to conduct the enlarged image display process.

In S150, an enlarged image 42, in which a part of the software keyboard 32 is enlarged to the particular enlarged size, as shown in FIG. 3C, and displayed in the enlarged image display area 41. In this regard, if the flow reached S150 through S140, the software keyboard 32 is enlarged centrically at the pointer position pointed at by the pointer 5, as shown in the screen transition from FIG. 3A to FIG. 3C. The center of enlargement may be the pointer position of the pointer 5 at the time when the holding period elapses, i.e., the pointer position immediately before the software keyboard 32 is enlarged, or may be the pointer position of the pointer 5 at the time when the touching operation is performed.

On the other hand, if the flow reached S150 through S200, a part of the software keyboard 32 is enlarged centrically at the released position, as shown in the screen transition from FIG. 3A to FIG. 3D.

Following the enlarged image displaying process in S150, in S155, the controller 11 determines whether a touching operation is being performed by the pointer 5. The determination in S155 is made in consideration of the flow to S150 from S200, in which the pointer 5 is once separated from the software key display area 31. Therefore, if the flow had reached S150 through S140, the controller 11 makes affirmative determination in S155 (S155: YES) and proceeds to S160. On the other hand, if the flow had reached S150 through S200, the controller 11 repeats S155 as long as the pointer 5 is separated from the enlarged image display area 41 (S155: NO), and when a touching operation is performed by the pointer 5 (S155: YES), the flow proceeds to S160.

In S160, the controller 1 determines whether a releasing operation performed by the pointer 5 is detected. If no releasing operation is detected (S160: NO), the flow proceeds to S220. In S220, the controller 11 determines whether the pointer position pointed at by the pointer 5 is located within the end area 52. If the pointer position is not detected within the end area 52 (S220: NO), the flow returns to S160. If the pointer position is detected within the end area 52 (S220: YES), that is, the pointer 5 has been moved to the end area 52 after the touching operation, or the pointer 5 performed the touching operation directly on the end area 52, the flow proceeds to S230.

In S230, the controller 11 manipulates the display 13 to scroll the enlarged image 42 in a direction according to the pointer position pointed to by the pointer 5. The controller 11 may continue scrolling the enlarged image 42 as long as the pointer position stays within the end area 52. When the enlarged image 42 is scrolled to an end in the scrolling direction, the controller 11 stops scrolling the enlarged image 42 thereat.

In S240, the controller 11 determines whether the pointer position exited the end area 52. If the pointer position staying within the end area 52 is detected (S240: NO), the flow returns to S230. If the pointer position is off from the end area 52 (S240: YES), in S250, the controller 11 stops scrolling the enlarged image 42, and the flow returns to S160.

In S160, if a releasing operation is detected (S160: YES), the flow proceeds to S170. In S170, the controller 11 determines whether the released position where the pointer 5 performed the releasing operation falls on any one of the software keys 43. In other words, the controller 11 determines whether the releasing operation was detected at any one of the software keys 43. If no releasing operation was detected at any one of the software keys 43 (S170: NO), the flow proceeds to S260. In S260, the controller 11 determines whether another touching operation performed by the pointer 5 is detected. If no another touching operation is detected (S260: NO), the controller 11 repeats S260 until another touching operation is performed. When another touching operation is detected (S260: YES), the flow returns to S160.

In S170, if the releasing operation was detected at any one of the software keys 43 (S170: YES), in S180, the controller 11 conducts a selection acceptance process for the software key 43 at the released position. In other words, the controller 11 accepts selection of a character assigned to the software key 43 at the released position and displays the selected character in the selection display field 35. The flow proceeds to S190.

In S190, the controller 11 ceases displaying the enlarged image 42 and restores the display to the character input screen 30, which had been displayed before the enlarged image displaying process in S150. Accordingly, the initial-sized software keyboard 32 is entirely displayed again in the software key display area 31. In this regard, while the software keyboard 32 is resized to the initial size, the selection for the character(s) having been accepted before the flow reached S190 is maintained to be displayed in the selection display field 35. Following the cessation of the enlarged display in S190, the flow returns to S120.

1-5. Benefits

According to the embodiment described above, while the initial-sized software keyboard 32 is being displayed, and when a touching operation is performed on any of the software keys 33 in the software keyboard 32, the software keyboard 32 is enlarged. Therefore, a user may select one of the enlarged software keys 43, and an erroneous touch on unintended software keys may be prevented. Further, while the software keys 43 are enlarged by the touching operation, the user may perform a releasing operation on any one of the enlarged software keys 43 so that the software key 43 being displayed at the released position may be selected to be accepted. In this regard, a sequence of operations, which may include a releasing operation to release the enlarged software key 43 once and another touching operation to select one of the enlarged software keys 43, may be omitted. Therefore, a quantity of operations to accept the user's selection may be reduced or restrained from increasing, and unintended input may be prevented.

According to the embodiment described above, further, the software keyboard 32 may be resized from the initial size to the enlarged size centrically at the position being pointed at by the pointer 5. In other words, the pointer position is maintained unchanged before and after the enlargement of the software keyboard 32. Therefore, the user may select an intended one of the software keys 43 after enlargement promptly.

According to the embodiment described above, further, once the selection of the software key 43 in the enlarged image 42 is accepted, the software keyboard 32 returns to the initial size so that the overall software keyboard 32 may be displayed in the software key display area 31. Therefore, the user may select one of the software keys 43 through the enlarged image 42 and thereafter view the initial-sized software keyboard 32 to find another one of the software keys 33 to select easily.

According to the embodiment described above, further, while the enlarged image 42 is being displayed, if a releasing operation is performed at a position where no software key 43 is being displayed, the enlarged image 42 is maintained displayed. Therefore, while the user may unintentionally perform a releasing operation at a position where no software key 43 is being displayed in the enlarged image 42, the user may promptly select any one of the software keys 43 through the enlarged image 42. In this regard, the user may intentionally perform a releasing operation at a position where no software key 43 is being displayed in the enlarged image 42 so that the enlarged image 42 may be maintained displayed while the pointer 5 is separated from the enlarged image 42. Thus, the user may perform a touching operation to the stably displayed enlarged image 42 to select the software keys 43 in the enlarged image 43.

According to the embodiment described above, further, the enlarged image 42 may not be displayed immediately after a touching operation to the initial-sized software keyboard 32 but may be displayed after the length of holding period following a pointing operation with the pointer 5. Therefore, when the user intends to enlarge the software keyboard 32, the user may hold the pointer 5 pointing at the software key 33 for the length of the holding period or longer. Meanwhile, if the user does not intend to enlarge the software keyboard 32, the user may release the pointer 5 from the software keyboard 32 before the holding time elapses. Therefore, the user may operate the pointer 5 to select the size of the software keyboard 32 between the initial size and the enlarged size efficiently.

According to the embodiment described above, further, while the initial-sized software keyboard 32 is being displayed, the user may perform a releasing operation to the software keyboard 32 at a position where no software key 33 is being displayed. In response to the releasing operation, the enlarged image 41 is displayed. Therefore, even if the user unintentionally releases the initial-sized software keyboard 31 at a position where no software key 33 is displayed, the user is provided with the enlarged image 41 so that the user may select any one of the software keys 42 promptly and efficiently through the enlarged image 41.

According to the embodiment described above, further, the software keys 42 being in the larger size than the initial-sized software keys 33 may not be displayed entirely in the enlarged image 41 at the same time, but merely a part of the software keys 42 may be displayed in the enlarged image 41. However, the enlarged image 41 may be scrolled to display another part by moving the pointer position pointed at by the pointer 5 to the end area 52. Therefore, while the enlarged image 42 is provided to the user, the user may find a desired software key 42 easily in the enlarged image 42.

2. More Examples

Although an example of carrying out the disclosure have been described, those skilled in the art will appreciate that there are numerous variations and permutations of the displaying input device and the storage medium that fall within the spirit and scope of the disclosure as set forth in the appended claims. It is to be understood that the subject matter defined in the appended claims is not necessarily limited to the specific features or act described above. Rather, the specific features and acts described above are disclosed as example forms of implementing the claims.

2-1. For example, an area in which the enlarged image may be displayed within the image displayable region in the display 13 may be set at preference of a user's or a manufacture. In other words, a user or a manufacturer may set a range for the enlarged image display area 41 within the image displayable region preferably. For example, the enlarged image display area 41 may be set in the same range for the software key display area 31, in which the initial-sized software keyboard 32 is displayed. For another example, the enlarged image display area 41 may be expanded as far as an area overlapping the selection display field 35. For another example, the enlarged image display area 41 may be expanded to range over the entire image displayable region in the display 13.

2-2. For another example, the software keyboard 32 may not necessarily require the particular length of holding period after a touching operation to the software key display area 31 by the pointer 5 to be replaced to the enlarged image 42 but may be displayed immediately after the touching operation to the software key display area 31 by the pointer 5.

2-3. For another example, the end area 52, which may be touched by the pointer 5 in order to scroll the enlarged image 42, may not necessarily be limited to the positions shown in FIG. 5A but may be set by a user or a manufacturer preferably.

2-4. For another example, application of the present disclosure may not necessarily be limited to the QWERTY keyboard as shown in FIG. 2, but the present disclosure may be equivalently applied to any software keyboard including a software numeric keypad and a software keyboard for any characters, signs, and symbols.

Furthermore, application of the present disclosure may not necessarily be limited to software keyboards, but the present disclosure may be equivalently applied to any displaying input device, through which one of selectable objects arrayed on a screen may be selected by a user. For example, the present disclosure may be applied to a displaying input device, in which a user may select one or more of thumbnail images displayed in arrays by a pointing operation with a pointer. Further, a quantity of the selectable object(s) to be displayed may not necessarily be limited but may be one (1).

2-5. For another example, application of the present disclosure may not necessarily be limited to the image processing apparatus 10 shown in FIG. 1. The present disclosure may be applied to any displaying input device, which is equipped with a display and a touch-sensitive panel, and provides selectable images to a user to select one of them through the touch-sensitive panel in the display.

2-6. A plurality of functions described in the embodiment above may or may not necessarily be implemented by a single element but may be provided by a plurality of elements. For another example, any single function described above may or may not necessarily be implemented by a single element but may be provided by combination of a plurality of elements. Further, the configuration described in the embodiment may be partly omitted, or a part of the configuration described above in the embodiment may be extracted to be added to another embodiment or to replace a configuration in another embodiment. It may be noted that the specific features and acts described above are disclosed as example forms of implementing the claims.

What is claimed is:

1. An input apparatus, comprising:
   a display comprising an image displayable region in which an image is displayable;
   a touch-sensitive panel configured to output position information indicating a pointer position, in which a pointing operation by a pointer is being performed, in the image displayable region, the pointing operation including at least one of contact and close approach of the pointer to the image displayable region;

a storage device configured to store data for an overall image, the overall image including a plurality of selectable images; and a controller configured to execute:
- a detecting process, in which the controller detects the pointer position based on the position information output from the touch-sensitive panel and a specific operation performed by the pointer, the specific operation being based on the pointing operation and including a touching operation, by which a state where no pointing operation is being performed shifts to a state where the pointing operation is being performed, and a releasing operation, by which the state where the pointing operation is being performed shifts to the state where no pointing operation is being performed;
- an initial display process, in which the controller controls the display to display the overall image based on the data stored in the storage device in an initial size at a selectable image display area in the image displayable region;
- an enlarged image display process, in which, based on detection of the touching operation in the detecting process while the overall image is being displayed in the initial size in the selectable image display area, the controller controls the display to display an enlarged image being a part of the overall image enlarged in an enlarged size, the enlarged size being larger than the initial size, in an enlarged image display area in the image displayable region, the enlarged image display area including at least the selectable image display area;
- a determining process, in which, based on detection of the releasing operation while the enlarged image is being displayed in the enlarged image display process, the controller determines whether one of the selectable images is displayed at a released position, the released position being the pointer position where the releasing operation is being performed, and
- a selection acceptance process, in which, based on a determination in the determining process that one of the selectable images is displayed at the released position, the controller accepts selection of the one of the selectable images being displayed at the released position, wherein the controller controls the display to maintain the enlarged image, enlarged from the initial size, displayed in the enlarged image display area after the detection of the touching operation at a starting position in the selectable image display area, a sliding operation to slide the pointer on the touch-sensitive panel from the starting position to the released position without releasing the pointer, and the releasing operation in the detecting process while the enlarged image, enlarged from the initial size, is being displayed in the enlarged image display process, and based on a determination in the determining process that none of the selectable images is displayed at the released position but the released position falls on an area outside outlines of the selectable images within the enlarged image enlarged from the initial size.

2. The input apparatus according to claim 1,
wherein the part of the initial-sized overall image is enlarged centrically at the pointer position in the enlarged image display process.

3. The input apparatus according to claim 1,
wherein the controller is configured to execute the initial display process after executing the selection acceptance process.

4. The input apparatus according to claim 1,
wherein the controller is configured to execute the enlarged image display process based on the detection of the touching operation in the detecting process while the overall image is being displayed in the initial size in the selectable image display area and further on a condition where the pointing operation in the detected touching operation is maintained at least for a length of a particular holding period while the overall image is being displayed.

5. The input apparatus according to claim 4,
wherein the controller is configured to execute the enlarged image display process based on the detection of the touching operation in the detecting process while the overall image is being displayed in the initial size in the selectable image display area and based on a condition where the pointing operation in the detected touching operation is not maintained for the length of the particular holding period and further on the determination in the determining process that the released position falls on the area outside the outlines of the selectable images within the enlarged image.

6. The input apparatus according to claim 5,
wherein the controller is configured to execute:
- a long-pointing determining process, in which the controller determines whether the condition where the pointing operation in the detected touching operation is maintained at least for the length of the particular holding period; and
- a releasing operation detecting process, in which, based on a determination in the long-pointing determining process that the condition where the pointing operation in the detected touching operation is not maintained at least for the length of the particular holding period but the releasing operation is detected before an end of the length of the particular holding period arrives, the controller determines whether the released position of the releasing operation falls on an area outside outlines of the selectable images within the overall image where none of the selectable images is displayed, wherein the controller is configured to execute the enlarged image display process based on one of a determination in the releasing operation detecting process that the released position falls on the area outside outlines of the selectable images within the overall image and on a determination in the long-pointing determining process that the condition where the pointing operation in the detected touching operation is maintained at least for the length of the particular holding period; and wherein the controller is configured to execute the selection acceptance process without executing the enlarged image display process based on the determination in the long-pointing determining process that the condition where the pointing operation in the detected touching operation is not maintained at least for the length of the particular holding period but the releasing operation is detected before the end of the length of the particular holding period arrives and further on a determination in the releasing operation detecting process that the released position falls on one of the selectable images in the overall image.

7. The input apparatus according to claim 1,
wherein the controller is configured to execute a scrolling process, in which, while the enlarged image is being displayed in the enlarged image display process, the enlarged image to be displayed in the enlarged image display area is scrolled in a direction corresponding to the pointer position based on a condition where the pointer position detected in the detecting process is located in an end area, the end area being set inside the enlarged image display area along an outline of the enlarged image display area.

8. The input apparatus according to claim 1,
wherein at least one of the selectable images is a textual image indicating a specific character; and
wherein the specific character indicated by the textual image is displayed in a particular character display area in the image displayable region in the selection acceptance process based on a condition where the textual image is being displayed at the released position.

9. A non-transitory computer readable medium storing computer readable instructions that are executable by a computer in an input apparatus,
the input apparatus comprising:
a display comprising an image displayable region in which an image is displayable;
a touch-sensitive panel configured to output position information indicating a pointer position, in which a pointing operation by a pointer is being performed, in the image displayable region, the pointing operation including at least one of contact and close approach of the pointer to the image displayable region; and
a storage device configured to store data for an overall image, the overall image including a plurality of selectable images,
the computer readable instructions, when executed by the computer, causing the computer to execute:
a detecting process, in which the computer detects the pointer position based on the position information output from the touch-sensitive panel and a specific operation based on the pointing operation performed by the pointer, the specific operation including a touching operation, by which a state where no pointing operation is being performed shifts to a state where the pointing operation is being performed, and a releasing operation, by which the state where the pointing operation is being performed shifts to the state where no pointing operation is being performed;
an initial display process, in which the computer controls the display to display the overall image based on the data stored in the storage device in an initial size at a selectable image display area in the image displayable region;
an enlarged image display process, in which, based on detection of the touching operation in the selectable image display area in the detecting process while the overall image is being displayed in the initial size in the selectable image display area, the computer controls the display to display an enlarged image being a part of the overall image enlarged in an enlarged size, the enlarged size being larger than the initial size, in an enlarged image display area in the image displayable region, the enlarged image display area including at least the selectable image display area;
a determining process, in which, based on detection of the releasing operation while the enlarged image is being displayed in the enlarged image display process, the controller determines whether one of the selectable images is displayed at a released position, the released position being the pointer position where the releasing operation is being performed, and
a selection acceptance process, in which, based on a determination in the determining process that one of the selectable images is displayed at the released position, the computer accepts selection of the one of the selectable images being displayed at the released position,
wherein the computer readable instructions, when executed by the computer, cause the computer to control the display to maintain the enlarged image, enlarged from the initial size, displayed in the enlarged image display area after the detection of the touching operation at a starting position in the selectable image display area, a sliding operation to slide the pointer on the touch-sensitive panel from the starting position to the released position without releasing the pointer, and the releasing operation in the detecting process while the enlarged image, enlarged from the initial size, is being displayed in the enlarged image display process, and based on a determination in the determining process that none of the selectable images is displayed at the released position but the released position falls on an area outside outlines of the selectable images within the enlarged image enlarged from the initial size.

10. The computer readable medium according to claim 9,
wherein the part of the initial-sized overall image is enlarged centrically at the pointer position in the enlarged image display process.

11. The computer readable medium according to claim 9,
wherein the computer readable instructions, when executed by the computer, cause the computer to execute the initial display process after executing the selection acceptance process.

12. The computer readable medium according to claim 9,
wherein the computer readable instructions, when executed by the computer, cause the computer to execute the enlarged image display process based on the detection of the touching operation in the detecting process while the overall image is being displayed in the initial size in the selectable image display area and based on a condition where the pointing operation in the detected touching operation is maintained at least for a length of a particular holding period.

13. The computer readable medium according to claim 12,
wherein the computer readable instructions, when executed by the computer, cause the computer to execute the enlarged image display process based on the detection of the touching operation in the detecting process while the overall image is being displayed in the initial size in the selectable image display area and based on a condition where the pointing operation in the detected touching operation is not maintained for the length of the particular holding period and on a condition where the released position corresponds to an area within the enlarged image where none of the selectable images is displayed.

14. The computer readable medium according to claim 9,
wherein the computer readable instructions, when executed by the computer, cause the computer to execute a scrolling process, in which, while the enlarged image is being displayed in the enlarged image display process, the enlarged image to be displayed in the enlarged image display area is scrolled in a direction corresponding to the pointer position based on a condition where the pointer position detected in the detecting process is located in an end area, the end area being set inside the enlarged image display area along an outline of the enlarged image display area.

15. The computer readable medium according to claim 9, wherein at least one of the selectable images is a textual image indicating a specific character; and wherein the specific character indicated by the textual image is displayed in a particular character display area in the image displayable region in the selection acceptance process based on a condition where the textual image is being displayed at the released position.

16. A method to control an input apparatus, the input apparatus comprising a display including an image displayable region in which an image is displayable; a touch-sensitive panel configured to output position information indicating a pointer position, in which a pointing operation by a pointer is being performed, in the image displayable region, the pointing operation including at least one of contact and close approach of the pointer to the image displayable region; a storage device configured to store data for an overall image, the overall image including a plurality of selectable images; and a controller, the method comprising:

detecting the pointer position based on the position information output from the touch-sensitive panel and a specific operation performed by the pointer, the specific operation being based on the pointing operation and including a touching operation, by which a state where no pointing operation is being performed shifts to a state where the pointing operation is being performed, and a releasing operation, by which the state where the pointing operation is being performed shifts to the state where no pointing operation is being performed;

controlling the display to display the overall image based on the data stored in the storage device in an initial size at a selectable image display area in the image displayable region;

based on detection of the touching operation in the selectable image display area while the overall image is being displayed in the initial size in the selectable image display area, controlling the display to display an enlarged image being a part of the overall image enlarged in an enlarged size, the enlarged size being larger than the initial size, in an enlarged image display area in the image displayable region, the enlarged image display area including at least the selectable image display area;

based on detection of the releasing operation while the enlarged image is being displayed in the enlarged image display process, determining whether one of the selectable images is displayed at a released position, the released position being the pointer position where the releasing operation is being performed, and based on determining that one of the selectable images is displayed at the released position, accepting selection of the one of the selectable images being displayed at the released position, wherein the enlarged image, enlarged from the initial size, displayed in the enlarged image display area is maintained after the detection of the touching operation at a starting position in the selectable image display area, a sliding operation to slide the pointer on the touch-sensitive panel from the starting position to the released position without releasing the pointer, and the releasing operation while the enlarged image, enlarged from the initial size, is being displayed, and based on determining that none of the selectable images is displayed at the released position but the released position falls on an area outside outlines of the selectable images within the enlarged image enlarged from its initial size.

17. The method according to claim 16, wherein the enlarged image is displayed based on the detection of the touching operation while the overall image is being displayed in the initial size in the selectable image display area and based on a condition where the pointing operation in the detected touching operation is maintained at least for a length of a particular holding period.

18. The method according to claim 17, wherein the enlarged image is displayed based on the detection of the touching operation while the overall image is being displayed in the initial size in the selectable image display area and based on a condition where the pointing operation in the detected touching operation is not maintained for the length of the particular holding period and on a condition where the released position corresponds to an area within the enlarged image where none of the selectable images is displayed.

19. The method according to claim 16, wherein, while the enlarged image is being displayed, the enlarged image to be displayed in the enlarged image display area is scrolled in a direction corresponding to the pointer position based on a condition where the detected pointer position is located in an end area, the end area being set inside the enlarged image display area along an outline of the enlarged image display area.

* * * * *